Dec. 30, 1930.	H. W. GROM	1,787,266
METHOD OF MAKING LENS MOUNTINGS
Filed Jan. 29, 1930

INVENTOR
Henry W. Grom
BY Harold E. Stonebraker,
his ATTORNEY

Patented Dec. 30, 1930

1,787,266

UNITED STATES PATENT OFFICE

HENRY W. GROM, OF NEWARK, NEW JERSEY, ASSIGNOR TO CONTINENTAL OPTICAL FRAME COMPANY, OF NEWARK, NEW JERSEY, A CORPORATION OF NEW JERSEY

METHOD OF MAKING LENS MOUNTINGS

Application filed January 29, 1930. Serial No. 424,290.

This invention relates to lens mountings for eyeglasses, and particularly to an improved method of making the same.

The principal object of the invention is the provision of a simple and inexpensive method of making lens mountings for eyeglasses adapted to receive an ornamental design in such a manner as to render indiscernible the line of contact between the parts in which the temples are pivoted.

Another object of the invention is the provision of a method of making lens mounts which consists in securing a cover plate, which may be provided with an ornamental design, to the ends of a split lens rim and to the temple hinge members, projecting therefrom when spaced a predetermined distance from each other and cutting the cover plate along the gap between the ends of the split rim and hinge members so that when the ends of the rim are moved into contact with each other the parts of the cover plate are moved into contact with each other and the parts of the design thereon are brought into exact registration with each other.

A still further object of the invention is the provision of a method of making lens mounts which consists in forming a design in relief in complementary parts, separated by a narrow space on a cover plate, and securing the cover plate to the ends of a split lens rim, with the space between the parts of the design opposite the gap between the ends of the rim and cutting away the cover plate between the parts of the design, so that the parts of the cover plate are brought into contact with each other and the parts of the design into registration.

To these and other ends, the invention consists in the construction and arrangement of parts that will appear from the following description when read in conjunction with the accompanying drawings, the novel features being pointed out in the claims following the specification.

Figure 2:
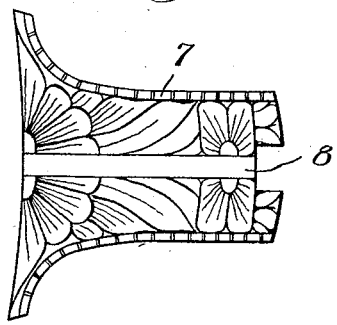
Figure 2 is a front elevation of the cover plate.

Referring more particularly to the drawings, in which like reference numerals refer to the same parts in all figures, 1 represents a split lens rim, having lugs 2 and 3 projecting laterally from the adjacent ends thereof and providing convenient means for securing the ends together to clamp a lens in the rim and also providing hinge members in which the temple is pivotally mounted. The ends of the hinge members are cut at their inner sides at 4 to form a clearance for the end of the temple which engages the inner wall thereof when fully extended. Each of the projections 2 and 3 is provided with openings 5 and 6 which are adapted to aline with each other, the openings 5 being adapted to receive a headed screw for securing the parts together and clamping the rim on the periphery of a lens, and the openings 6 receive the pivot for the temple, as usual in the art.

Figure 1:
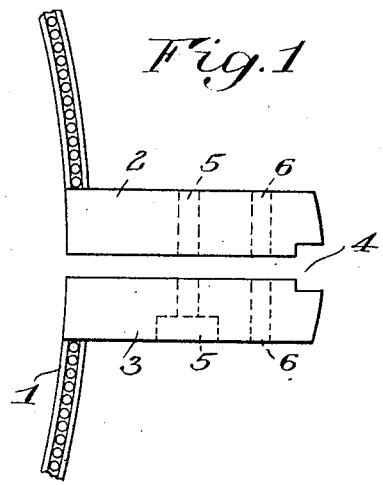
Figure 1 is a fragmentary front elevation of the open side of a split eyeglass lens rim, showing the hinge members on the ends thereof spaced for the reception of the cover plate.
Figure 3:
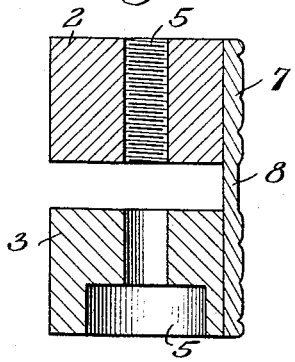
Figure 3 is a transverse sectional view through the temple hinge with the cover plate secured thereto.

The ends of the rim or lugs 2 and 3 are spaced a predetermined distance apart to form a gap between them, and a cover plate 7 is secured to the front faces thereof. Said cover plate is made in the form shown in Figure 2 and is somewhat broader in vertical breadth, as seen in the drawings, than the combined breadth of the lugs or hinge members 2 and 3, so that when secured thereto with its upper and lower edges flush respectively with the upper edge of the member 2 and the lower edge of the member 3, said members are secured in spaced relation with a gap between them, substantially as show in Figure 1.

The front face of the plate 7 may be engraved with a suitable ornamental design in relief, formed in two complementary or symmetrical parts, separated by the plain area 8. The area 8 extends throughout the length of the plate and is of a width substantially equal to the distance or gap between the ends of the rim or the members 2 and 3 when the plate is secured thereto with its upper and lower edges substantially flush with the upper edge of the member 2 and the lower edge of the member 3. The plate may be secured to the members 2 and 3 by any suitable means, preferably by soldering.

The portion 8 of the cover plate is then cut away by any suitable means, such as a saw, flush with the inner edges of the hinge members or lugs 2 and 3. This operation again frees the ends of the rim from each other and leaves the inner edges of the design in relief on the plate, flush with the inner edges of the members 2 and 3.

Figure 5:
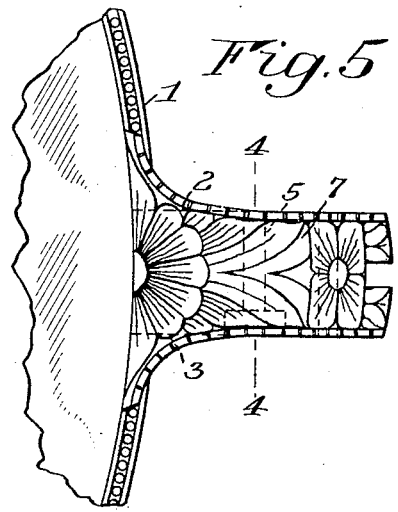
Figure 5 is a fragmentary view of the outer end of a lens mount constructed according to one way of performing the invention.
Figure 4:
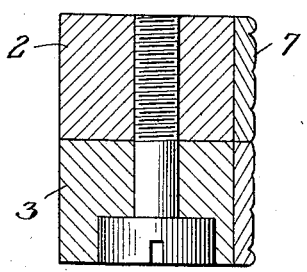
Figure 4 is a similar view showing the cover plate cut away between the ends of the split rim, and the ends of the split rim secured together, the section being taken substantially on line 4—4 of Figure 5.

When a lens is mounted in the rim, the ends of the rim are secured together to clamp it on a lens by means of a screw, as shown, or other suitable means. By this means, the members 2 and 3 are clamped firmly into contact with each other, as shown in Figure 4, and the inner edges of the two parts of the plate 7 are moved together into close contact with each other, as shown in Figures 4 and 5, and the two parts of the design then register with each other, and the design being formed in relief renders the border line between them substantially indiscernible. At its inner ends the upper and lower edges of the plate curve upwardly and downwardly in the general direction of the rim, which also has a design thereon, thus giving the appearance of a design on the rim continuous with that on the cover plate.

Although the invention has been described with reference to a particular method of performing the same, it will be understood that this application is intended to cover such changes or modifications as come within the spirit of the invention or scope of the following claims.

I claim:

1. The method of making lens mounts comprising hinge members, which consists in forming a plate and securing the same to the front faces of the hinge members spaced from each other, and cutting out that portion of the plate positioned over the gap between the hinge members.

2. The method of making lens mounts, which consists in forming a laterally projecting lug on each of the adjacent ends of a split lens rim, securing a plate to the front faces of said lugs, said plate being of a size and shape adapted to completely conceal the lugs when the ends of the rim are spaced from each other, and cutting out that portion of the plate positioned over the gap between the lugs.

3. The method of making lens mounts, which consists in forming a laterally projecting lug on each of the adjacent ends of a split lens rim, spacing the lugs a predetermined distance apart, securing a plate to the front faces of said lugs, said plate being of a size and shape to completely conceal the lugs when the ends of the rims are spaced from each other, and cutting out that portion of the plate positioned over the gap between the lugs, said plate being provided with an ornamental design, the parts of which, when the plate is cut, are adapted to register with each other when the ends of the rim are secured to each other to clamp a lens therein.

4. The method of making lens mounts which consists in forming a laterally projecting lug on each of the adjacent ends of a split lens rim, forming a cover plate of a size and shape to conceal the lugs when spaced from each other to form a gap between them and forming an ornamental design in relief on its front face, spacing the lugs a predetermined distance apart, securing the plate to the front faces of the lugs, and cutting out that portion of the plate positioned over the gap between the lugs, the parts of the design on the plate being so formed that they register with each other when the lugs are secured in contact with each other.

5. The method of making lens mounts, which consists in forming a laterally projecting lug on each of the adjacent ends of a split lens rim, forming a cover plate of a size and shape to conceal the lugs and ends of the rim when spaced from each other to form a gap between them, forming an ornamental design in two corresponding parts on its front face, and securing it to the front faces of the lugs with one of said parts of the design opposite each of the lugs, and cutting out that portion of the plate positioned over the gap between the lugs, the two parts of the design being adapted to register with each other when the lugs are moved into contact with each other to clamp a lens in the rim.

6. The method of making lens mounts, which consists in forming a laterally projecting lug on each of the adjacent ends of a split lens rim, forming a cover plate of a size and shape to conceal the lugs and ends of the rim when spaced from each other to form a gap between them, forming a design on its front face, said design being formed in two corresponding parts spaced from each other, and securing the plate to the front faces of the lugs with the space between the parts of the design opposite a gap between the lugs, and cutting away that part of the plate between the parts of the design so that when the lugs are moved into contact with each other to clamp a lens in the rim, the parts of the design are moved into registry with each other.

7. The method of making lens mounts, which consists in forming a laterally projecting hinge member on each of the adjacent ends of a lens rim, spacing said hinge members a predetermined distance from each other, forming a cover plate of a size and shape to conceal the hinge members and ends of the rim when spaced from each other, forming a design on its front face, said design being formed in relief in two symmetrical parts separated by a plain surface of a width corresponding to the gap between the hinge members, and soldering the plate to the hinge members with its plain surface over the gap between them, and cutting away that portion of the plate bearing the plain surface.

8. The method of making lens mounts, which consists in forming a laterally projecting hinge member on each of the adjacent ends of a lens rim, spacing said hinge members a predetermined distance from each other, forming a cover plate of a size and shape to conceal the hinge members and ends of the rim when spaced from each other, forming a design on its front face, said design being formed in relief in two symmetrical parts separated by a plain surface of a width corresponding to the gap between the hinge members, and soldering the plate to the hinge members with its plain surface over the gap between them, and cutting away that portion of the plate positioned over the gap between the hinge members, so that when the hinge members are secured to each other to clamp a lens in the rim the parts of the design register with each other and render the meeting line between the two parts of the plate substantially indiscernible.

9. The method of making lens mounts which consists in forming a laterally projecting lug on each of the adjacent ends of a split lens rim having an ornamental design formed thereon, spacing the ends a predetermined distance apart, forming a cover plate of a size and shape to conceal the lugs and the ends of the rim when spaced from each other, forming a design in relief on its front face in two symmetrical parts and formed to continue the design on the rim, soldering the plate to the lugs with one part of the design directly in front of each of the lugs, and cutting away that portion of the plate in front of the gap between the lugs, so that when the lugs are moved into contact with each other to clamp a lens in the rim the symmetrical parts of the design are moved together and render the meeting line between the two parts of the plate substantially indiscernible.

In witness whereof, I have hereunto signed my name.

HENRY W. GROM.